Figure 1:
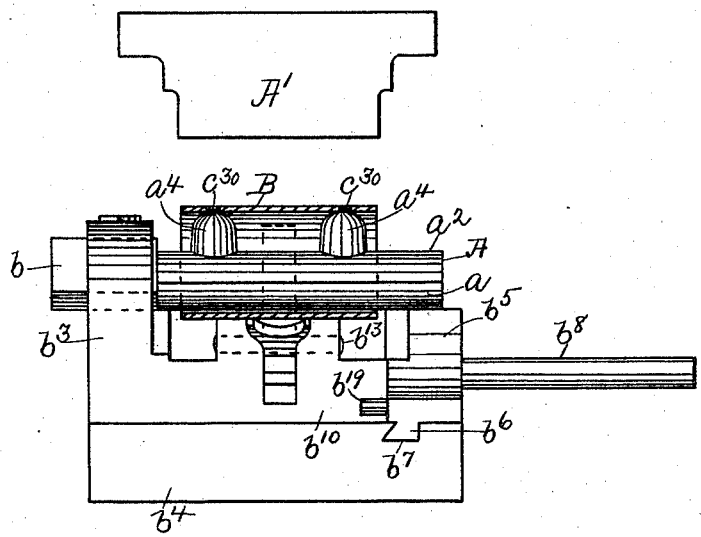

(No Model.)  2 Sheets—Sheet 1.

P. FORG.
BICYCLE HANGER.

No. 581,907.  Patented May 4, 1897.

WITNESSES.  INVENTOR.
Matthew M. Blunt  Peter Forg
J. Murphy  by Jas. H. Churchill
 ATT'Y.

(No Model.) 2 Sheets—Sheet 2.
P. FORG.
BICYCLE HANGER.
No. 581,907. Patented May 4, 1897.
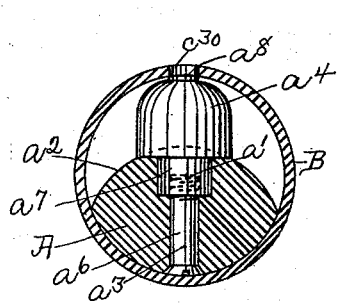
Fig. 4.
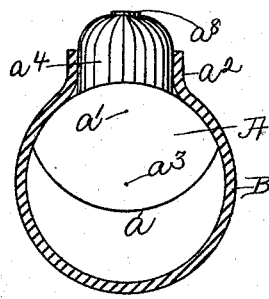
Fig. 5.
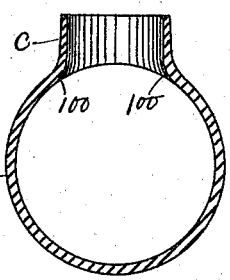
Fig. 6.
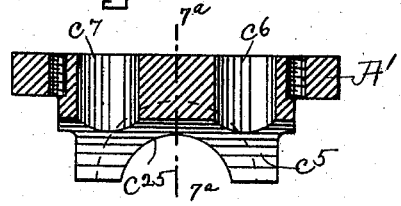
Fig. 7.
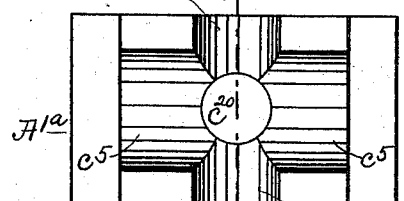
Fig. 8.
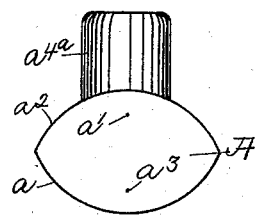
Fig. 11.
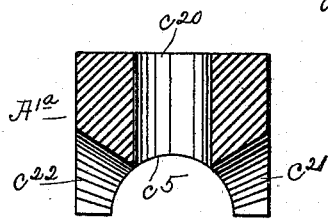
Fig. 9.
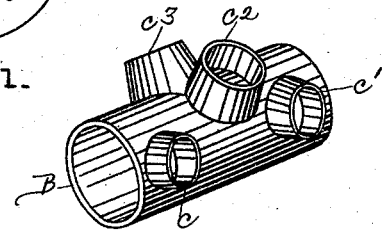
Fig. 10.
WITNESSES.
Matthew M. Blunt.
J. Murphy
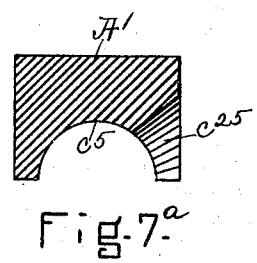
Fig. 7ª
INVENTOR.
Peter Forg
By Jas. H. Churchill
ATT'Y.

UNITED STATES PATENT OFFICE.

PETER FORG, OF SOMERVILLE, MASSACHUSETTS.

BICYCLE-HANGER.

SPECIFICATION forming part of Letters Patent No. 581,907, dated May 4, 1897.

Application filed June 11, 1895. Serial No. 552,436. (No model.)

*To all whom it may concern:*

Be it known that I, PETER FORG, a citizen of the United States, residing in Somerville, in the county of Middlesex and State of Massachusetts, have invented an Improvement in Bicycle-Hangers, of which the following description, in connection with the accompanying drawings, is a specification, like letters on the drawings representing like parts.

This invention has for its object the production, as a new article of manufacture, of a closed drawn-metal tube having its body or walls connected and in one piece and provided with a plurality of outwardly-extended hollow bosses or tubular projections, the walls of which are integral with the walls of the body portion and normally lie in the same plane or circumference. The tubular article referred to is especially designed and adapted for use, among other things, as a hanger for bicycles. These hangers are employed to support the shaft to which the pedal arms or cranks are secured and form the connecting means by which the brace rods or bars of the framework are coupled or joined together to form a solid frame. It is especially desirous in bicycles to make the various parts as light as possible consistent with strength, and therefore the hangers of bicycles are made of substantially small diameter. Heretofore these hangers have been made in various ways, but in every case known to me the integrity of the tube from which the hanger is made has been destroyed, either by making the hanger in two parts and fastening the same together to complete the tube, as, for instance, by means of bolts extended through ears on the two halves or parts of the tube or hanger or by cutting or otherwise removing a part from the tube sufficiently large for the insertion radially into the tube of a suitable tool for forming the hollow bosses or projections to which the frame rods or pipes are secured.

Heretofore it has been considered practically impossible to form the hollow bosses or projections of a bicycle-crank hanger on a closed drawn tube of substantially small diameter, with the adjacent lower portions of the inclined bosses substantially close together, so as to preserve the integrity of the tube and have the completed hanger retain its circular form.

It is the object of this invention to produce such a hanger, which is especially well adapted for use on bicycles, as it is stronger, lighter, and cheaper than hangers as now commonly made and known to me.

My improved hanger may and preferably will be made with an apparatus as will be hereinafter described.

Figures 2, 3:
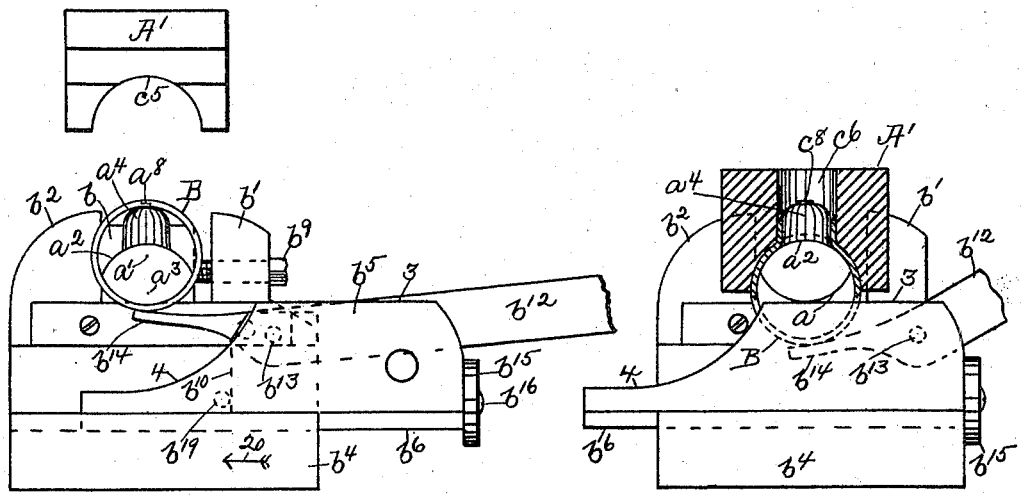

Figure 1 represents in elevation and section a sufficient portion of one form of apparatus with which to produce this invention, the operating parts being shown in elevation and the tube which is to be formed into the hanger being shown in section; Fig. 2, a side elevation of the apparatus shown in Fig. 1, looking toward the left, the support for the anvil or former being shown in its withdrawn position; Fig. 3, a partial section and elevation of the apparatus shown in Fig. 1, looking toward the left, the die or plunger being shown in section in its lowered position and the support for the anvil being shown in its forward or operative position; Fig. 4, a detail on an enlarged scale showing the anvil and the tube in their first position with relation to each other; Fig. 5, a detail of the anvil and tube, showing the latter in its second position; Fig. 6, a detail of the tube shown in Fig. 5 removed from the anvil; Fig. 7, a longitudinal section of the die or former employed to form two hollow bosses or projections at the same time; Fig. 7$^a$, a transverse section of the die shown in Fig. 7 on the line 7$^a$ 7$^a$; Fig. 8, an inverted plan or under side view of the die or plunger employed for forming the large hollow bosses or projections of the hanger; Fig. 9, a sectional detail on the line 9 9, Fig. 8, of the die shown therein; Fig. 10, a perspective view of one form of hanger made in accordance with this invention and such as now commonly employed in bicycles; and Fig. 11, a detail of the finishing-anvil, to be referred to.

In the present instance I have chosen to illustrate the hanger embodying this invention of the form now commonly employed on bicycles as now commonly constructed, such hanger, usually composed of steel, being shown in Fig. 10, but before specifically describing the same I will describe the apparatus by which the said hanger is formed.

Referring to Figs. 1 and 3, A represents one form of anvil or former, and A' one form of die or plunger which coöperates with the said anvil, as will be described.

The former or anvil A consists of a metal bar having its upper surface $a^2$ made in the arc of a circle of substantially the same radius as the internal circumference of the tube, and preferably having its lower surface or bottom $a$ (see Figs. 3 and 5) of equal radius as the upper surface $a^2$, the upper surface having the center $a^3$ and the bottom surface $a$ the center $a'$. The upper surface has extended from it one or more nubs or projections $a^4$, forming practically radial arms, and the extreme outer surface of said nubs, for the best results, substantially forms the same circle as the bottom surface $a$ of the said anvil. The nubs or projections $a^4$ may be made integral with the anvil or they may be made detachable therefrom, after the manner represented in Fig. 4, namely, by means of a countersunk screw $a^6$, projecting up from the bottom surface of the anvil through and into a threaded socket in the under side of a bottom projection $a^7$, forming part of the nub $a^4$, or in any other suitable manner.

In Fig. 4 the nub $a^4$ is represented as provided with a small teat or projection $a^8$ of a length not to exceed the thickness of the stock or metal of the tube B which is to be formed into the hanger, and for the best results the teat $a^8$ is made as small as possible and preferably forms the extreme outer surface of the nub.

The anvil A may and preferably will be formed by taking a circular bar or rod of a diameter substantially equal to the inner diameter of the tube B and turning off the upper surface of the bar until it is less than the internal diameter of the tube B an amount substantially equal to the length it is desired that the nub $a^4$ and its teat $a^8$ should be, which length of nub is determined by the length of the hollow boss or projection to be formed by it. The upper portion of the circular bar is turned off until it coincides with the arc of a circle having its center at $a^3$ and a radius equal to the radius of the original circular bar, both of which radii are substantially equal to the radius of the internal circumference of the tube B.

The anvil A may be supported in a suitable frame, and in the present instance the said anvil is shown as provided at one end with a rectangular portion $b$, (see Figs. 1 and 2,) which is fitted between ears $b'$ $b^2$, secured to or forming part of an upright $b^3$, erected from a suitable base $b^4$, the circular portion or end of the anvil being in practice preferably made longer than the length of the tube B which is to be formed into the hanger and having its front end adapted to rest upon and be sustained by a movable support $b^5$, the said support being shown as a block of metal provided with a substantially flat upper surface 3 and with a curved or cut-away front surface 4, the said support being herein shown as provided on its under side with a dovetailed rib or fin $b^6$, fitted into a dovetailed slot or opening $b^7$ (see Fig. 1) in the base $b^4$.

In the present instance the movable support $b^5$ is provided with a projecting rod $b^8$, serving as a handle by which the support $b^5$ may be reciprocated on the base $b^4$. In the present instance the anvil A is represented as secured in position between the ears $b^2$ $b'$ by a threaded clamping-bolt $b^9$, extended through a threaded opening in the upright or ear $b'$.

The base $b^4$ may and preferably will have secured to or forming part of it, at what may be termed its "rear" side, an upright block $b^{10}$, (see Fig. 1 and dotted lines, Fig. 2,) the said upright being slotted to receive a lever $b^{12}$, pivoted in the slotted portion of the upright, as at $b^{13}$, and having its short arm $b^{14}$ projecting under the anvil A for a purpose as will be described.

In the construction of movable support $b^5$ herein shown the forward movement in the direction indicated by arrow 20, Fig. 2, is limited by a back-stop, herein represented as a disk or washer $b^{15}$, secured to the support $b^5$ by the screw $b^{16}$, and the movement of the said support in a rearward direction—that is, opposite to that indicated by the arrow 20—may be limited by a pin $b^{19}$, engaging the front of the upright block $b^{10}$, as represented in Figs. 1 and 2.

Referring to Fig. 10, I have shown a completed hanger, which may be supposed to have been formed from the tube B represented in Figs. 1 and 2, the said tube having been cut off from a long tube, which is closed and drawn out in its manufacture either as a seamless tube or as a welded tube, so that the tube B before the hollow bosses are formed in it is closed and drawn and of substantially great strength, which is not lessened in the manufacture of the hanger. The hanger shown in Fig. 10 is provided with two substantially small hollow bosses or projections $c$ $c'$, located substantially near the opposite ends of the tube and with two substantially large hollow projections or bosses $c^2$ $c^3$, located near the longitudinal center of the tube B at an angle to each other, with their adjacent lower portions in substantially close contact with each other. The hanger represented in Fig. 10 contains four hollow projections or bosses, and a hanger having this number of hollow projections or bosses is now commonly employed for forming part of a bicycle-frame as now commonly designed and made.

The smaller hollow bosses $c$ $c'$ of the hanger shown in Fig. 10 may be supposed to be made by the anvil A, provided with the two nubs $a^4$, as shown in Fig. 1, and these two hollow bosses are formed or made in one operation of the plunger or die A', which may and preferably will be of the construction represented in Figs. 1, 7, and 7$^a$, it consisting of a metallic block provided on its under surface with a longitudinally-extended circular cavity or semicircular groove $c^5$, made in substantially the same arc of the circle as the outer circumference of the tube B, the said longitudinal cavity having communicating with it two circular holes or openings $c^6$ $c^7$ for the reception of the two nubs $a^4$ on the anvil A, (shown in Fig. 1,) together with the metal of the tube B, which is utilized in forming the hollow projections $c$ $c'$. The die or plunger A' in practice is operated by power and may be suitably supported to reciprocate above the anvil in any suitable or usual manner, such as now commonly employed in the construction of power or drop or other presses. The smaller hollow bosses $c$ $c'$ and the larger hollow bosses $c^2$ $c^3$ may be formed on the same apparatus by the employment of different anvils, or they may be formed on separate machines, each equipped with the appropriate anvils.

If the larger hollow bosses $c^2$ $c^3$ are formed on the apparatus shown in Fig. 1, the anvil A therein shown will be removed and a new anvil substituted therefor, having a nub or projection $a^5$ of suitable length and diameter for forming the hollow bosses $c^2$ $c^3$. When the hollow bosses $c^2$ $c^3$ are to be formed, a die or plunger of suitable shape to form the said hollow bosses will be used.

In Figs. 8 and 9 I have represented a die suitable for forming the hollow bosses $c^2$ $c^3$, which die I prefer to letter A'$^a$, it being provided with a longitudinal circular cavity or groove $c^5$, communicating with the central opening $c^{20}$ and with two circular transverse cavities or grooves $c^{21}$ $c^{22}$, the circular cavities $c^{21}$ $c^{22}$ being made in the arc of a circle having a diameter substantially equal to the external diameter of the hollow bosses $c^2$ $c^3$, so that the two hollow bosses $c^2$ $c^3$ may be formed on the same machine by first forming one of the hollow bosses—as, for instance, the hollow boss $c^2$—and then turning the tube B so that the hollow boss $c^2$ will lie in one of the transverse circular grooves $c^{21}$ $c^{22}$ while the other hollow boss or projection $c^3$ is being formed.

In manufacturing the particular hanger shown in Fig. 10 the hollow bosses $c^2$ $c^3$ may and preferably will be formed first. The tube B, which is complete and in one piece, is preferably first provided with a small hole $c^{30}$ for the reception of the centering-teat $a^8$ on the hub $a^4$ of the anvil or former employed for forming the hollow bosses $c^2$ $c^3$, and the tube B is then preferably heated, if the tube is of hard metal, which heating expands the metal and enlarges the diameter of the tube sufficiently to permit the tube to be easily slipped over the anvil, clearing the teat $a^8$, the said tube being turned until the teat $a^8$ is in line with the small centering-hole referred to, after the manner represented in Fig. 4.

By reference to Fig. 4 it will be seen that the upper surface $a^2$ of the anvil or former A is not in contact with the tube B, while its lower surface $a$ and the surface $a^8$ of the nub $a^4$ are substantially in contact with the inner circumference of the said tube, and in practice the lower surface is separated from the tube by a distance equal to the length of the teat $a^8$ when the nub $a^4$ is provided with the said teat. The length of the teat $a^8$ is substantially infinitesimal, and in Figs. 1 and 2 this separation does not appear, whereas in Fig. 4 the teat $a^8$ is shown in line with but not extended into the centering-opening. The tube B is now properly positioned on the anvil, and the die or plunger A'$^a$ is brought with considerable force down over the tube B, which is carried downward by the said die until the latter is arrested in its downward movement by the anvil A, and at such time the upper portion of the tube B has been brought in contact with and pressed over the upper surface $a^2$ of the anvil, except that part of the tube which is opened and drawn out by the die A'$^a$, forcing the said tube over and around the nub $a^4$, which latter and an annular portion of the tube enter the tubular opening $c^{20}$ of the die and form or partially form the annular hollow boss or projection $c^2$, as represented in Fig. 5. The die A'$^a$ is then withdrawn and the tube B may be raised from the position shown in Figs. 3 and 5 by means of the lever $b^{12}$, after which it may be taken off from the anvil A and subjected, if desired, to a second operation in a machine having a larger nub $a^{4a}$ on its anvil, (see Fig. 11,) by means of which the hollow boss may be elongated and given a more perfect annular shape. I prefer to employ two different anvils or formers for each hollow boss, one of which may be termed the "starting-anvil" and the other the "finishing-anvil;" but I do not desire to limit my invention in this respect, as satisfactory results may be obtained with one anvil. Having formed one hollow boss—as, for instance, the boss $c^2$—the tube is turned on the anvil until the teat $a^8$ on the nub $a^4$ enters the centering-hole for the boss $c^3$, and when properly positioned the die A'$^a$ is operated to form the boss $c^3$, as above described in relation to the boss $c^2$. The bosses $c^2$ $c^3$ having been formed, the tube is placed on the anvil A (shown in Fig. 1) when it is desired to form the bosses $c$ $c'$ in one operation, and the hollow boss $c^3$ at such time projects downward from the under side of the anvil, while the boss $c^2$ projects substantially upward in a lateral direction, but by reason of the transverse groove or cavity $c^{25}$, which communicates with the longitudinal groove $c^5$ of the die A', the upwardly-projecting boss $c^2$ does not interfere with the operation of the die A in forming the two hollow bosses $c$ $c'$, as the walls of the transverse groove $c^{25}$ in the descent of the die straddle the hollow boss $c^2$. The hollow bosses $c$ $c'$ after being formed with the anvil and die shown in Fig. 1 may be subjected, if desired, to a second operation on the anvil having two nubs $a^{4a}$ of the proper diameter to give to the hollow bosses $c\,c'$ a more perfect cylindrical form and to elongate the metal walls of the said bosses. The tube B has now been formed into the hanger shown in Fig. 10, and in practice the hollow bosses $c\,c'$ may have connected to them the brace rods or bars running to the rear wheel of the bicycle, while the larger boss $c^2$ has usually connected to it the saddle-post, and the larger boss $c^3$ is connected by a brace-rod to the post carrying the handle-bars.

I prefer to employ two anvils in the formation of each hollow boss, or one anvil and two nubs, as $a^4\,a^{4a}$; but I do not desire to limit my invention in this respect, as a single anvil having a single nub may produce satisfactory results. Furthermore, I prefer to provide what I have herein designated the "starting" nubs with the centering projections or teats $a^8$; but while I prefer to use teats $a^8$, they are not absolutely necessary, as they may be dispensed with, in which case the small hole need not absolutely be required, although I prefer to use the same as a means of starting the formation of the tubular bosses. The teats or projections $a^8$ and the small holes first made in the tube for their reception insure accurate centering of the nubs and therefore accurate formation of the various hollow bosses in their proper position on the tube.

From the above description it will be seen that the tube from which the hanger shown in Fig. 10 is formed is not divided or weakened by taking a large part away therefrom, but remains closed and an integral piece the same as it was before being subjected to the treatment above described. As a result, the hanger is materially increased in strength, is lighter, and can be manufactured cheaper than hangers as now commonly made. Furthermore, it will be noticed that the walls of the outwardly-extended hollow bosses are normally in the same plane or circumference as the walls of the body or main portion of the tube, and by reference to Fig. 6 it will be seen that the inner surface of the body portion is curved or rounded at the base of the outwardly-extended hollow boss or projection, as at 100, which construction, when coupled with the integral tubular body portion, enables my improved hangers to be readily distinguished from hangers as now commonly made.

I claim—

1. As a new article of manufacture, a crank-hanger for bicycles consisting of a closed drawn-metal tube having its circumferential wall normally unbroken, and a plurality of outwardly-extended hollow bosses integral with the wall of the closed drawn tube and projecting from the tube at an angle to each other with their adjacent lower portions substantially close together and provided with rounded inner edges, substantially as described.

2. As a new article of manufacture, a crank-hanger for bicycles consisting of a seamless tube B provided with the substantially central outwardly-extended hollow bosses $c^2\,c^3$ projecting at an angle to each other with their adjacent lower portions substantially in contact and provided with rounded inner edges, and with the hollow bosses $c\,c'$ located near the opposite ends of the tube B and projecting from the tube at a different angle from the bosses $c^2\,c^3$ and provided with rounded inner edges, the whole being of integrally continuous and homogeneous wrought metal, substantially as described.

In testimony whereof I have signed my name to this specification in the presence of two subscribing witnesses.

PETER FORG.

Witnesses:
JAS. H. CHURCHILL,
J. MURPHY.